US012425973B2

(12) United States Patent
Jantzi et al.

(10) Patent No.: US 12,425,973 B2
(45) Date of Patent: Sep. 23, 2025

(54) BATTERY POWER CONSERVATION FOR ASSET TRACKING DEVICES

(71) Applicant: BlackBerry Limited, Waterloo (CA)

(72) Inventors: Jason Wayne Jantzi, St. Clements (CA); Ryan Anthony Bivinetto, Houston, TX (US); Ryan Michael Parker, Ottawa (CA)

(73) Assignee: BlackBerry Limited, Waterloo (CA)

( * ) Notice: Subject to any disclaimer, the term of this patent is extended or adjusted under 35 U.S.C. 154(b) by 332 days.

(21) Appl. No.: 18/332,055

(22) Filed: Jun. 9, 2023

(65) Prior Publication Data

US 2024/0414653 A1    Dec. 12, 2024

(51) Int. Cl.
*H04W 52/02*    (2009.01)
(52) U.S. Cl.
CPC ... *H04W 52/0251* (2013.01); *H04W 52/0235* (2013.01)
(58) Field of Classification Search
CPC .............. H04W 52/0251; H04W 52/0235
USPC .............................................. 455/574
See application file for complete search history.

(56) References Cited

U.S. PATENT DOCUMENTS

| | | | | |
|---|---|---|---|---|
| 6,344,794 B1* | 2/2002 | Ulrich | ................ | G06K 17/0022 340/8.1 |
| 7,801,506 B2* | 9/2010 | Haave | ................ | B60R 25/33 455/457 |
| 8,130,096 B2* | 3/2012 | Monte | ................ | G08B 21/0277 340/988 |
| 9,799,185 B2* | 10/2017 | Jessop | ................ | G08B 21/0269 |
| 10,827,310 B2* | 11/2020 | Winograd | ................ | G01S 5/0027 |
| 11,234,205 B2* | 1/2022 | Mulaosmanovic | ................ | G06Q 10/0833 |
| 11,265,689 B1* | 3/2022 | Konen | ................ | H04W 76/18 |
| 11,681,974 B2* | 6/2023 | Sharma | ................ | G06Q 10/0833 705/333 |
| 11,758,379 B2* | 9/2023 | Lansford | ................ | B60D 1/62 455/41.2 |
| 11,770,677 B1* | 9/2023 | Lesesky | ................ | H04W 4/42 455/456.1 |
| 11,878,719 B2* | 1/2024 | Ahmad | ................ | G08G 1/162 |
| 11,954,637 B2* | 4/2024 | Cawse | ................ | G01S 5/0295 |
| 12,054,159 B2* | 8/2024 | Klomp | ................ | B60W 40/08 |

(Continued)

FOREIGN PATENT DOCUMENTS

| | | | | |
|---|---|---|---|---|
| AU | 2021221470 B2 * | 12/2023 | ............. | H04W 4/80 |
| CA | 2910843 | 1/2009 | | |

(Continued)

OTHER PUBLICATIONS

EESR dated Jul. 9, 2024; European Application No. 24179303.3.

*Primary Examiner* — April G Gonzales
(74) *Attorney, Agent, or Firm* — Conley Rose, P.C.; J. Robert Brown, Jr.

(57) ABSTRACT

Methods and systems for controlling an asset tracking device and, in particular, determining when an asset tracking device attached to a trailer is in close proximity to a truck. The device may enter a sleep mode when the trailer has been coupled to a truck with an electronic logging device (ELD). Thereafter, the device ceases obtaining a GPS location and transmitting the location to a central server. While the trailer and truck remain coupled, the device leverages the ELD by using it to send its GPS location to the central server and therefore, prolong its battery life.

20 Claims, 5 Drawing Sheets

(56) References Cited

U.S. PATENT DOCUMENTS

| | | | | |
|---|---|---|---|---|
| 12,069,542 B1* | 8/2024 | Atkinson | | H04W 4/029 |
| 12,140,445 B1* | 11/2024 | Akhtar | | G01C 21/3492 |
| 12,154,068 B2* | 11/2024 | Paul | | H04W 4/38 |
| 12,228,944 B1* | 2/2025 | Dubin | | G08G 1/13 |
| 12,306,010 B1* | 5/2025 | Rommel | | G01C 21/3822 |
| 2008/0048856 A1* | 2/2008 | Culpepper | | H04W 4/02 |
| | | | | 342/357.31 |
| 2013/0082828 A1* | 4/2013 | Furey | | G08B 1/08 |
| | | | | 340/286.01 |
| 2013/0147617 A1* | 6/2013 | Boling | | G06Q 10/0833 |
| | | | | 340/431 |
| 2016/0343224 A1* | 11/2016 | Markwell | | H04W 4/02 |
| 2017/0308727 A1* | 10/2017 | Lombardi | | G06Q 10/08 |
| 2017/0332199 A1* | 11/2017 | Elliott | | H04W 4/023 |
| 2019/0202382 A1* | 7/2019 | Srnec | | G09B 5/02 |
| 2019/0235092 A1* | 8/2019 | Bastian, II | | G01P 15/04 |
| 2019/0318629 A1* | 10/2019 | Ranjan | | G06Q 50/40 |
| 2020/0202292 A1* | 6/2020 | Doig | | G01S 5/0027 |
| 2020/0349496 A1* | 11/2020 | Irwin | | G06Q 10/083 |
| 2020/0382925 A1* | 12/2020 | Doig | | G01S 19/51 |
| 2021/0110480 A1* | 4/2021 | Kwak | | G07C 5/008 |
| 2021/0295247 A1* | 9/2021 | Volkerink | | H04W 4/029 |
| 2021/0312726 A1* | 10/2021 | Schäfer | | H04W 4/23 |
| 2023/0297953 A1* | 9/2023 | Plonski | | G06Q 10/0838 |
| | | | | 705/28 |
| 2023/0394419 A1* | 12/2023 | Elenjickal | | G06Q 10/0833 |
| 2024/0373192 A1* | 11/2024 | Cattermole | | H04W 4/029 |
| 2025/0208279 A1* | 6/2025 | Fuleshwar Prasad | | G01S 11/02 |

FOREIGN PATENT DOCUMENTS

| | | | | |
|---|---|---|---|---|
| CN | 208285554 | | 12/2018 | |
| CN | 108702586 B | * | 2/2021 | ............ H04W 4/029 |
| CN | 109791649 B | * | 3/2024 | ........ G06Q 10/0833 |
| EP | 3482227 B1 | * | 10/2020 | ............ G01S 19/34 |
| EP | 3482225 B1 | * | 5/2021 | ............ H04W 64/00 |
| EP | 4475055 A1 | * | 12/2024 | ........ H04W 52/0235 |
| WO | WO-2018031423 A1 | * | 2/2018 | ........... G01S 5/0294 |
| WO | 2020236387 | | 11/2020 | |
| WO | 2021053611 | | 3/2021 | |

* cited by examiner

BATTERY POWER CONSERVATION FOR ASSET TRACKING DEVICES

FIELD

The present application relates to the field of asset tracking devices, and more specifically, to methods and systems of conserving battery power in asset tracking devices.

BACKGROUND

Asset tracking devices may be attached to shipping containers, train cars, truck frames, or other items for which a user wishes to track their geographical locations. The asset tracking devices typically obtain location data using satellite signals, if available. If the device is unable to obtain a satellite signal, it may attempt to listen for cellular tower signals to determine its location using cellular triangulation, or other such methods. In some cases, it may listen for WLAN signals or other such signals to try to determine its location. The devices then periodically obtain a data connection over a cellular network and transmit a location report to a central server. A registered user account having one or more associated tracking devices may enable a user to log into the central server to obtain information regarding the location or location history of their associated tracking devices.

Asset tracking devices are typically battery-powered devices. Due to their deployment in the field for long periods of time, which can sometimes span years, it is advantageous for the asset tracking devices to preserve battery power when possible.

BRIEF DESCRIPTION OF THE DRAWINGS

Reference will now be made, by way of example, to the accompanying drawings which show example embodiments of the present application. In the drawings.

Similar reference numerals may have been used in different figures to denote similar components.

DESCRIPTION OF EXAMPLE EMBODIMENTS

Figure 1:
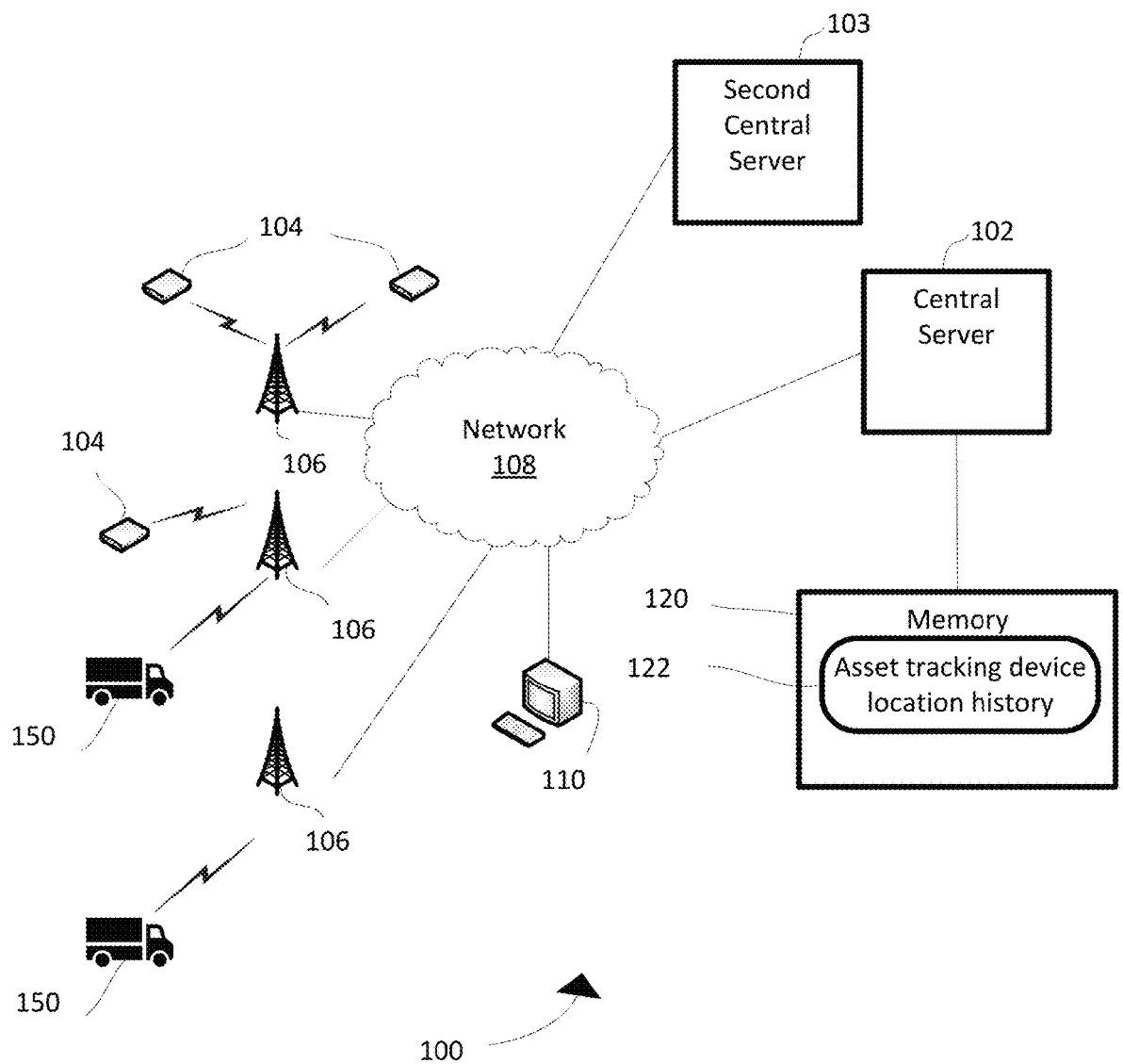
FIG. 1 illustrates an asset tracking system communicating with and monitoring asset tracking devices in various geographical locations.

In one aspect, the present application describes a method of preserving battery power for an asset tracking device. The method may include detecting, at the asset tracking device attached to a trailer, using a communication system, a first trigger identifying a third-party electronic logging device (ELD) attached to a truck in close proximity, and in response, generating an association between the trailer and the truck, wherein the ELD has a first mobile network connection and a location tracking capability; in response to detecting the first trigger, entering, at the asset tracking device, a sleep mode in which the asset tracking device does not periodically determine its location using a global navigation satellite system (GNSS) chip and does not periodically power a cellular transceiver; and detecting, at the asset tracking device, a second trigger and, in response, exiting the sleep mode and entering a normal operating mode in which the asset tracking device is configured to periodically determine its location using the GNSS chip, to periodically power the cellular transceiver to seek a connection to a mobile network, and to provide location data from the GNSS chip to a central server over the connection to the mobile network.

In some implementations, the ELD is configured to provide location data to the central server and wherein the method further comprises determining a location of the asset tracking device based on the location data sent by the ELD and the association between the trailer and the truck.

In some implementations, the first trigger includes detecting a short-range broadcast signal from the ELD and the method further comprising entering a pairing mode at the asset tracking device and, using a short-range communication system, establishing a short-range wireless connection with the ELD.

In some implementations, detecting the second trigger includes detecting loss of the short-range wireless connection with the ELD.

In some implementations, detecting the first trigger includes detecting a short-range beacon signal from a beacon mounted on the truck and the association between the truck and the trailer is generated based on an identifier in the beacon signal.

In some implementations, detecting the second trigger includes failing to detect the short-range beacon signal from the beacon.

In some implementations, further comprising transmitting the identifier to the central server and receiving, from the central server, an instruction to enter the sleep mode.

In some implementations, the second trigger includes one or more of detecting a stop event using an inertial sensor in the asset tracking device; detecting a trailer-open event using a sensor configured to detect opening of a door of the trailer; detecting an unpairing signal transmitted by the ELD based on a user input; or detecting a collision based on a collision-detection sensor in the asset tracking device.

In some implementations, the method may further include, responsive to detecting the first trigger, sending, by the asset tracking device, a report to the central server regarding the first trigger.

In some implementations, the method may further include, responsive to detecting the second trigger, sending, by the asset tracking device, a report to the central server regarding the second trigger.

In another aspect, the present application provides an asset tracking device comprising: a short-range communication system; a global navigation satellite system (GNSS) chip; a cellular transceiver; a controller; and a memory storing processor executable instructions that, when executed by the controller, cause the controller to: detect, using a communication system, a first trigger identifying a third-party ELD attached to a truck in close proximity, and in response, generate an association between the trailer and the truck, wherein the ELD has a first mobile network connection and a location tracking capability; in response to detecting the first trigger, entering a sleep mode in which the asset tracking device does not periodically determine its location using the GNSS chip and does not periodically power a cellular transceiver; and detect a second trigger, and in response, exit the sleep mode and enter a normal operating mode in which the asset tracking device is configured to periodically determine its location using the GNSS chip, to periodically power the cellular transceiver to seek a connection to a mobile network, and to provide location data from the GNSS chip to a central server over the connection to the mobile network.

In some implementations, the ELD is configured to provide location data to the central server, and the central server determines a location of the asset tracking device based on the location data sent by the ELD and the association between the trailer and the truck.

In some implementations, the first trigger includes a short-range broadcast signal from the ELD and thereafter, the asset tracking device enters a pairing mode and, using a short-range communication system, establishing a short-range wireless connection with the ELD.

In some implementations, the second trigger includes a loss of the short-range wireless connection with the ELD.

In some implementations, the first trigger includes a short-range beacon signal from a beacon mounted on the truck and the association between the truck and the trailer is generated based on an identifier in the beacon signal.

In some implementations, the second trigger includes failing to detect the short-range beacon signal from the beacon.

In some implementations, the instructions, when executed, are to cause the controller to transmit the identifier to the central server and receiving, from the central server, an instruction to enter the sleep mode.

In some implementations, the second trigger includes one or more of the following: a stop event using an inertial sensor in the asset tracking device; a trailer-open event using a sensor configured to detect opening of a door of the trailer; an unpairing signal transmitted by the ELD based on a user input; or a collision based on a collision-detection sensor in the asset tracking device.

In some implementations, the instructions, when executed, are to cause the controller to send, in response to detecting the first trigger, a report to the central server regarding the first trigger.

In some implementations, the instructions, when executed, are to cause the controller to send, in response to detecting the second trigger, a report to the central server regarding the second trigger.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to asset tracking devices. These devices may be attached to shipping containers, train cars, truck frames, or other items for which a user wishes to track their geographical location. Asset tracking devices typically contain a GNSS chip or other such hardware for obtaining location data using satellite signals. The asset tracking devices are typically battery-powered and may be deployed for long periods of time.

Asset tracking devices typically contain a cellular transceiver that enables them to periodically obtain a data connection over a cellular network and transmit a location report to a central server. The location report may contain one or more geolocation determinations or geolocation data, timestamps for when the data was obtained, and other such information. The central server may provide an interface that enables a registered user account having one or more associated tracking devices to log into the central server to obtain reported information regarding the location or location history of their associated tracking devices.

In some cases, the asset tracking device is attached to an unpowered asset, such as a trailer, shipping container, or other such asset, for which a user wishes to track its geographical location. Using its GNSS chip and/or its cellular transceiver the asset tracking device may be configured to periodically determine its geographical location. The asset tracking device may further be configured to periodically obtain a data connection to a mobile data network to transmit a location report to a central server, where the location report includes the geographical location data determined by the device from time-to-time.

In some cases, the trailer or shipping container is further coupled to a truck, e.g., a tractor or a semi-trailer. The truck may have an ELD. The ELD may contain a GNSS chip, a cellular transceiver, a plurality of sensing devices used for detecting physical events (e.g., temperature, humidity, barometric pressure, $CO_2$ concentration, acceleration, pressure, sound, movement, etc.) or components with similar features and functionality. The ELD typically will transmit a data report to a second central server. The data report may include geographical location data obtained from the GNSS chip. It may further include other data, such as sensor data or other logging data. The ELD is often connected to a power source within the truck, thereby enabling it to determine and report geographical location data frequently and, in some cases, effectively constantly. In other words, the ELD may enable real-time or near-real-time monitoring of the truck location and other logging data via the second central server. In some cases, in which the ELD and the asset tracking device are wirelessly connected, the ELD is a "master" and the asset tracking device is a "slave" in relation to, for example, the sharing of sensor data or other such data by the asset tracking device for relay by the ELD to a remote server.

In accordance with one aspect of the present application, an asset tracking device may preserve battery power by entering a sleep mode or state in which it does not periodically wake up to obtain and report geolocation data if it detects that it is in close proximity to an ELD on a truck. That is, when an asset tracking device is on a trailer and the trailer becomes attached to a truck with an ELD, the asset tracking device may cease obtaining and sending location data and the central server may instead rely on geolocation data from the ELD for tracking the location of the asset tracking device. That is, while the trailer and the truck are connected, the asset tracking device may go into a sleep mode to conserve battery life. During this period, the ELD associated with the truck obtains geographic location data and thereafter, transmitting the geographic location data to the second central server and/or the central server. The asset tracking device may be configured to resume normal operation and periodically wake up to obtain and report geolocation data once it detects that it is no longer attached to the truck, e.g., that the ELD is no longer in close proximity.

The asset tracking device is leveraging the ELD and preserving its battery life. Since the ELD is powered or charged by the truck's battery, there is unlikely to be an interruption in its continuous reporting of location data to the central server. By leveraging the ELD's location data reports whilst attached to an ELD-equipped truck, the asset tracking device avoids the unnecessary battery power loss from powering its GNSS chip and from powering the cellular transceiver to obtain a data connection and send duplicate location information. Instead, the central server may obtain location information from data reports sent directly to the central server by the ELD or from data relayed to the central server from the second central server.

FIG. 1 illustrates an example of an asset tracking system 100. The asset tracking system 100 may include a central server 102, a second central server 103, a plurality of asset tracking devices 104, a plurality of ELDs (not shown) installed on trucks 150 located in various locations.

The asset tracking devices 104 and ELDs may be in one country or many countries. The asset tracking devices 104 may be attached to various items, such as tractor trailers, shipping containers, train chassis, truck chassis, shipping pallets, and the like.

The asset tracking devices 104 may include one or more inertial measurement units (IMUs) for determining if the asset tracking device 104 is stationary or in motion, such as an accelerometer. The asset tracking devices 104 may include one or more geolocation determination devices, such as a GNSS chip. The asset tracking devices 104 may also include a cellular transceiver that enables them to receive signals from one or more nearby cellular towers 106 forming part of a mobile data network. The mobile data networks are interconnected with other data networks, such as the Internet in a computer network 108 to provide for worldwide data connectivity and communications capability. The asset tracking devices 104 are thus able to send and receive data with the central server 102 from any location in the world in which they are able to obtain a cellular data connection through a mobile data network. In some cases, the asset tracking devices 104 may also include a WLAN chip, such as a Wi-Fi chip set, that enables shorter-range wireless communications access to the computer network 108.

The asset tracking devices 104 may be configured to operate in a normal operating mode. In some implementations, the asset tracking devices 104 may be configured to periodically obtain location data and to report location data to the central server 102. In some cases, the periodicity may vary depending on whether the asset tracking device 104 is in motion or stationery. For example, if the asset tracking device 104 determines, from its IMU that it is not in motion and/or from a comparison of current location data to previous location data that it has not moved, then it may set a longer period of time before its next awakening, such as every 30 minutes, 1 hour, 2 hours, 6 hours, etc. If the asset tracking device 104 determines, from the IMU and/or from the location data, that it is in motion, then it may set a shorter time period, such as 5 minutes, 10 minutes, 15 minutes, etc.

The periodicity with which the asset tracking device 104 seeks a cellular data connection and sends a location report may be the same or may be different from the periodicity with which the asset tracking device 104 obtains location data. In some cases, the reporting may occur less frequently than the location data recordings, particularly if the asset tracking device 104 is in motion. For instance, if the device obtains location data every 5 minutes, it may be configured to only report the accumulated location data and timestamps every 30 or 60 minutes, to save power.

The third-party ELDs (not shown) installed in trucks 150 may, under normal operations, and regardless of whether the asset tracking devices 104 are in close proximity, continuously and periodically send data reports to the second central server 103. In some implementations, the data reports may include driving time, engine hours, geographic location, vehicle speed, miles driven, duty status, engine diagnostic data, and/or user authentication and carrier and vehicle information.

In some implementations, the central server 102 of the asset tracking system 100 and the second central server 103 communicate and exchange data. In some implementations, the central server 102 may be configured to retrieve data from the second central server 103. In some implementations, the second central server 103 may be configured to provide or transmit data to the central server 102. In some implementations, the data includes geolocation data of the third-party ELDs which provides the central server 102 with location data for any asset tracking devices 104 associated with those ELDs.

In some implementations, an application with the ability to send geolocation data to the central server 102, and connected to the asset tracking system 100, may be installed on the third-party ELD.

The third-party ELDs (not shown) installed in trucks 150 may not be owned by, produced by, or originate from the vendor of the asset tracking devices 104. In other words, the ELDs and the asset tracking devices 104 may not belong to the same ecosystem. For the ELDs to communicate or transmit location data to the central server 102 of the asset tracking system 100, the third-party ELDs may be configured to communicate with the central server 102, or the third-party ELDs may be integrated to the asset tracking system 100. In some implementations, the ELDs are programmed with a backend API to communicate with the central server 102.

In some implementations, when one of the asset tracking devices 104 detects that it is in close proximity with one of the trucks 150 mounted with an ELD, the asset tracking device 104 may be configured to enter a sleep mode. While in the sleep mode due to proximity of the ELD, the asset tracking device 104 may be configured not to power its GNSS chip and/or cellular transceiver on a periodic basis. That is, the asset tracking device 104 may cease periodically waking up to obtain location data and may remain in a lower-power state until such time as it determines that the ELD is no longer in close proximity. The asset tracking device 104 may be configured to return to a normal operating mode once it is no longer able to detect the ELD in close proximity.

Owners and operators of the asset tracking devices 104 may each have an associated user account with the central server 102 that enables them to remotely log into, or otherwise connect with, the central server 102, such as through an API via a mobile application or using other such technology.

By way of the user device 110, the user may send and receive communications with the central server 102 regarding one or more of the asset tracking devices 104 associated with the user account, including receiving data regarding the reported location of the asset tracking devices 104. It will be understood that various authentication and verification processes may be imposed by the central server 102 to ensure that data regarding one of the asset tracking devices 104 is only provided to an authorized user account with which the asset tracking device 104 is associated.

The central server 102 may provide data, including geographical location data, to the user device 110 that enables the user device 110 to output a graphical user interface showing, as an overlay on top of a map rendering, the location of one of the asset tracking devices 104. The overlay may include a symbol or marker rendered at the location in the GUI on top of the map corresponding to the geographical location last reported by the asset tracking device 104 in its location reports. In some cases, additional information may be made available for display on the user device 110 by the central server 102. Location reports may include information such as latitude and longitude coordinates and data obtained by the asset tracking device 104 from cellular tower signals that it is able to receive. The cellular data may include, for example, cellular tower identifier (i.e., Cell ID or CID), Radio Access Technology (RAT) such as GSM, UMTS, LTE, 5G, etc., cellular band, RSSI readings, mobile country code (MCC), Mobile Network Code (MNC), mobile network operator (MNO) identifier, location area code (LAC), and other such data.

In some implementations, the asset tracking device 104 may include other sensors, such as a temperature sensor, humidity sensor, vibration sensor, or other environmental sensors. That sensor data may be included in one or more of the location reports. In some cases, one or more sensors or other instruments may be contained in a different physical unit from the asset tracking device 104 and may communicate with the device using a low-power short range communication protocol, such as Bluetooth™ for example.

Figure 2:
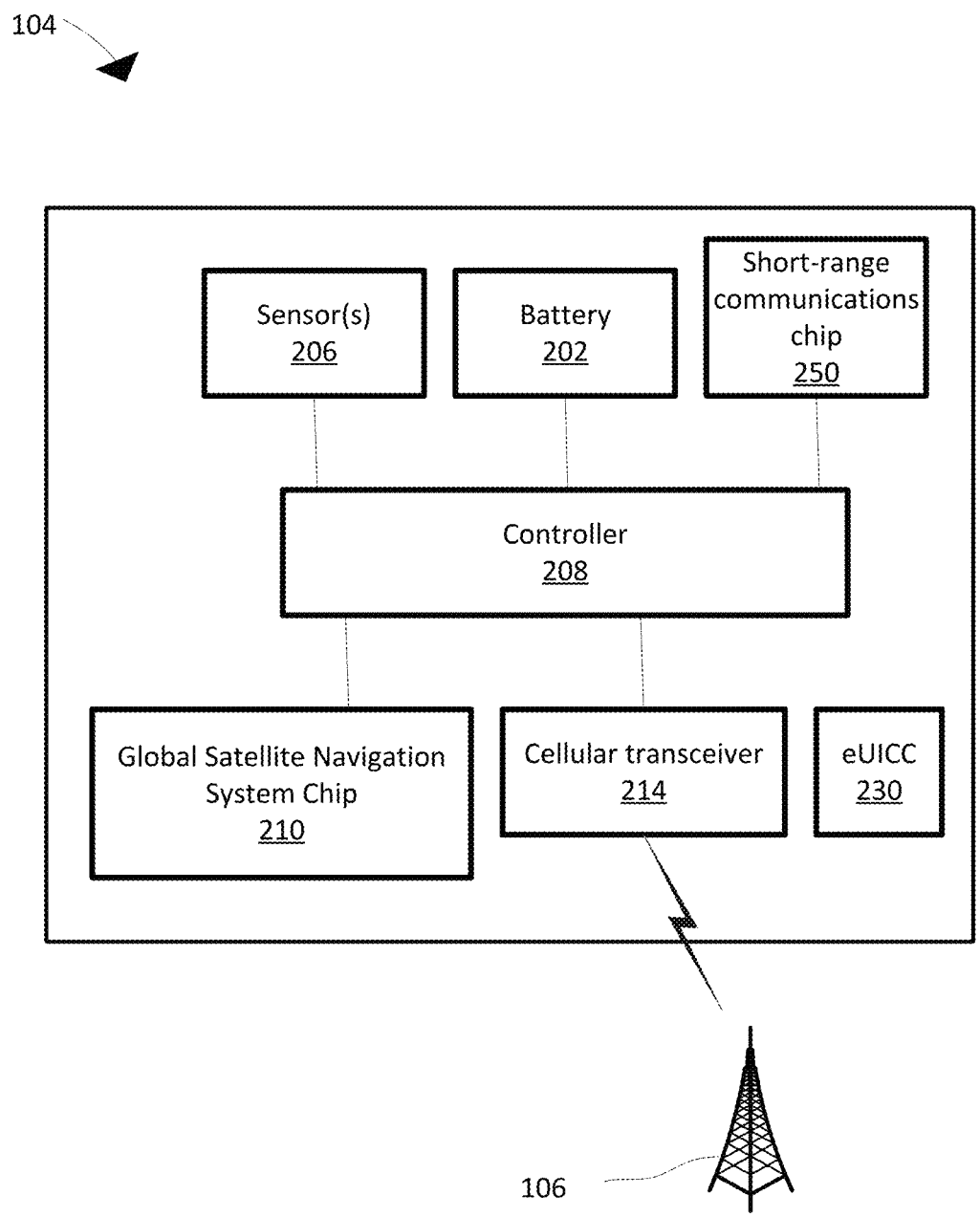
FIG. 2 illustrates a block diagram of a simplified example of an asset tracking device.

Reference is now made to FIG. 2 which shows, in block diagram form, one simplified example of the asset tracking device 104. The asset tracking device 104 may include one or more batteries 202 to power the asset tracking device 104. Battery 202 may be rechargeable or replaceable in some implementations, and the asset tracking device 104 may further include battery charging circuitry (not shown) to receive charge from an external power source.

The asset tracking device 104 in this example contains one or more sensors 206, a controller 208, a GNSS chip 210, a cellular signal transceiver 214, and a short-range communication system, which in this example is a short-range communications chip 250. The one or more sensors 206 may include environmental sensors, such as IMUs, temperature sensors, humidity sensors, dust sensors, chemical sensors, etc. In some cases, the one or more sensors 206 may include load-detection sensors for determining whether a container is loaded on a chassis or the quantity of a load on a chassis. Load-detection sensors may include a millimeter wave radar sensor, a range detector, strain gauge, switch, laser, Hall effect sensor, Time-of-Flight sensor, Reid switch, etc.

The controller 208 may, in some embodiments, be a microprocessor that may be coupled to memory (not pictured). In some cases, the controller 208 may be a microcontroller, an application-specific integrated circuit (ASIC), or another such processing unit. The controller 208 may include a timer and may be configured to awaken from a sleep mode based on the timer. The controller 208 may be configured to determine when to power up the GNSS chip 210 and/or cellular signal transceiver 214, and to obtain and store in memory location data and other data from either the GNSS chip 210 or the cellular signal transceiver 214. The controller 208 may control the cellular signal transceiver 214 and cause it to obtain a data connection with a cellular tower 106 to connect to a mobile network and to send and receive data with the central server (not shown).

The GNSS chip 210 receives location data from a plurality of satellites. The GNSS chip 210 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS chip 210 may be configured to determine, based on received satellite signals from three or more satellites, and output a set of geographic coordinates representing the geolocation of the asset tracking device 104.

The cellular signal transceiver 214 receives data from signals broadcast by a plurality of cellular signal towers 106. This data may include cellular tower identifiers, mobile network identifiers, mobile operator identifiers, timestamps, received signal strength measurements, and other such data. The asset tracking device 104 or the central server (not shown) may be configured to determine a geolocation from the data using cellular triangulation.

The short-range communications chip 250 may include one or more short-range communications technologies, such as Wi-Fi, Bluetooth™, low-power wide-area network (LP-WAN) technology, or other such technologies. In some cases, the short-range communications chip 250 may be used by the asset tracking device 104 to connect with and exchange communications with a nearby sensor unit or other peripheral related to the asset tracking device 104. In the examples described below, the short-range communications chip 250 may be used to receive and detect a beacon signal broadcast by a base station.

The geolocation data, cellular data, sensor data, and other data collected by the controller 208 may be saved in memory on the asset tracking device 104 together with a timestamp. The controller 208 may then cause the systems of the asset tracking device 104 to re-enter a sleep mode until next triggered by the timer and/or the IMU. When the controller 208 determines that a location report is to be sent to the central server, it may cause the cellular signal transceiver 214 to establish a wireless data connection with a mobile network, and to transmit a message to the central server containing the location report that include stored data, such as geolocation data, cellular data, sensor data, and other data.

Referring still to FIG. 1 and FIG. 2, the central server 102 may include memory 120 that stores data relating to the asset tracking devices 104. The memory 120 may further store data regarding user accounts and related authentication data and associations between user accounts and specific asset tracking devices 104. The location reports periodically received, or the data in those reports, may be stored in the memory 120 as asset tracking device location history 122. The asset tracking device location history 122 may include, for each asset tracking device 104 its associated geolocation at timestamps throughout its time in deployment. In some implementations, the memory 120 may only store a certain number or time period of most recent geolocation data so as to avoid excessive memory consumption, such as the past six or twelve months, for instance.

The asset tracking device 104, in some embodiments, may include an eSIM or eUICC 230 (embedded universal integrated circuit card) configured to permit the storage of more than one network profile and the remote provisioning of a network profile (e.g., mobile network credentials) in an over-the-air wireless provisioning operation. The eUICC 230 provides the cellular signal transceiver 214 with the network credentials for enabling establishment of a data connection with a particular mobile network operator. The credentials are associated with a mobile network plan governing the access to which the asset tracking device 104 is entitled to the mobile network and the billing plan associated with network communications by the asset tracking device 104.

Figure 3:
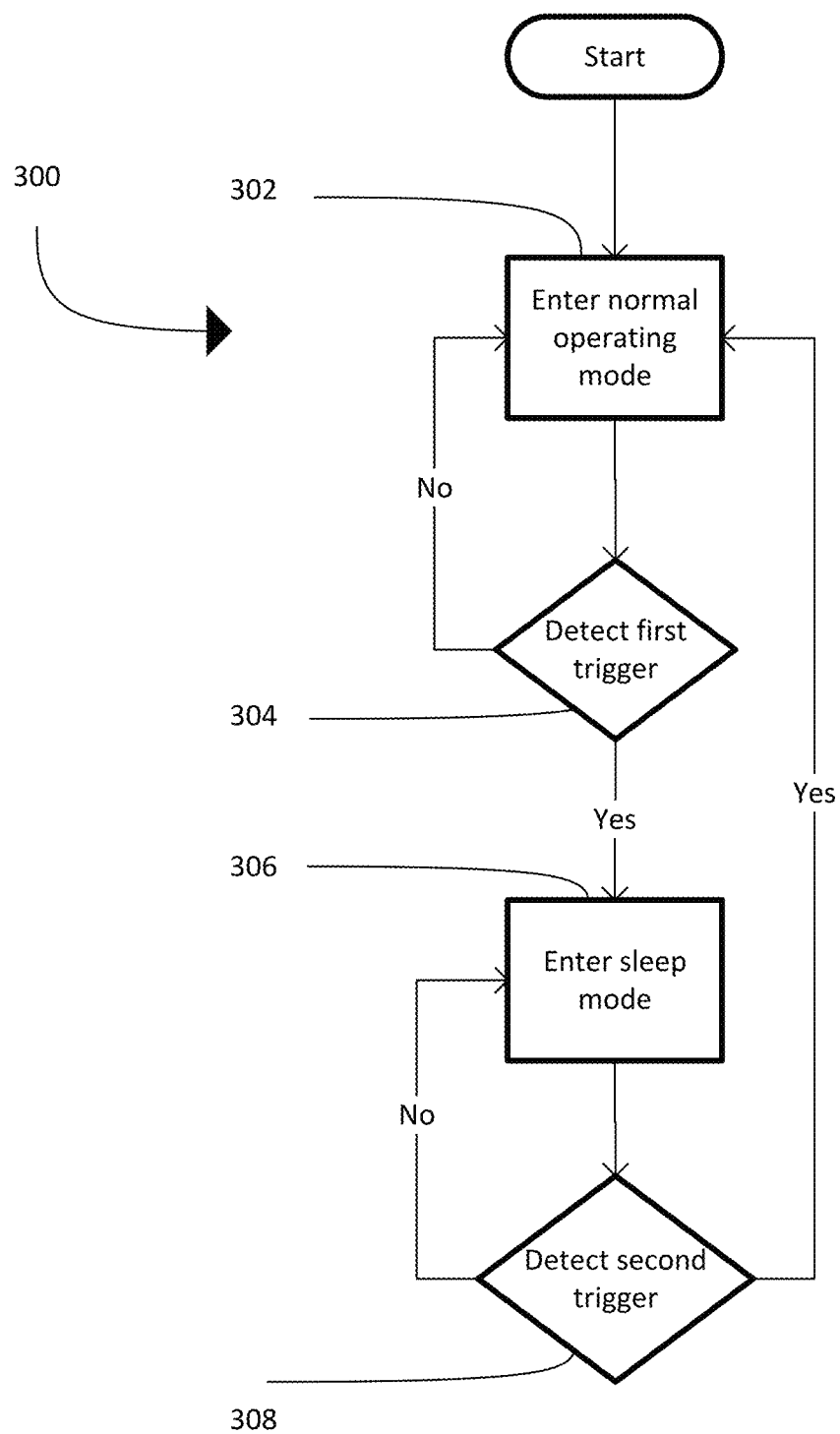
FIG. 3 illustrates a flowchart of a general method of controlling an asset tracking device in close proximity with a truck.

Reference is now made to FIG. 3 showing one simplified example of method 300 of controlling an asset tracking device. The method 300 may be implemented by way of software instructions executed by one or more processors, such as the controller 208 (FIG. 2) within an asset tracking device. The asset tracking device that implements the method 300 includes at least a controller, a GNSS chip, a cellular transceiver, and a short-range communications chip. In some cases, the asset tracking device may contain various sensor devices to collect data to be transmitted to the central server.

In operation 302, the asset tracking device is configured to operate in a normal operating mode under most conditions. In the normal operating mode, the device is configured to periodically, with a certain prescribed schedule, power up the controller and the GNSS chip to seek satellite signals and determine a geolocation. For example, the device is configured to retrieve a hot GPS fix every five minutes when the device is in motion.

In some cases, the normal operating mode may also include taking sensor readings or performing other functions with device electronics. The normal operating mode also involves periodic reporting to the central server. The reporting frequency may be the same as the geolocation determination frequency but, in many cases, the reporting occurs less frequently than the geolocation determination, such that each location report sent may contain multiple time-stamped geolocations. To send a report, the device powers the cellular transceiver and attempts to obtain a data connection over a mobile data network. Assuming it manages to connect to the mobile network, it transmits one or more location reports to the central server. The device may receive an acknowledgement message in reply and/or other configuration instructions or commands from the central server. The frequency of geolocation determination and/or reporting may change based on the configuration instructions or commands and/or based on whether the device determines that it is in motion or stationery using an inertial measurement unit, such as an accelerometer.

In operation 304, during the normal operating mode, the controller determines whether it detects a first trigger. In some implementations, the first trigger may include a beacon signal or a packet from a beacon attached to a truck, a signal from an ELD installed in the truck, a user input from a driver of the truck, a signal from the central server, detection of a pre-determined geofence, or a signal from a J series 7-pin connector, as examples.

In some implementations, in operation 304, under normal operating mode, the controller may detect a beacon signal from a beacon coupled to a truck indicating the truck is in close proximity. In some cases, the beacon is attached to or mounted on the exterior vertical rear surface of the cab of the truck. For example, under normal operating mode, the asset tracking device may periodically search or scan for beacons, using a short-range communications component. When an asset tracking device attached to a trailer approaches and is in close proximity to the beacon attached to a truck with an ELD, the asset tracking device may detect a signal from the beacon indicating to the asset tracking device that trailer is currently coupled to the truck. Thereafter, the asset tracking device may go into and remain in sleep mode until the signal from the beacon is no longer detectable by the asset tracking device. In some cases, the beacon and the asset tracking device may communicate using Bluetooth™, Bluetooth Low Energy (BLE), or short-range radio frequency (RF). In some cases, the beacon and/or the asset tracking device may be installed with an mmWave radar and/or a frequency-modulated continuous-wave (FMCW) radar and may communicate using FMCW signal 77 GHz-81 GHz. In some cases, the signal from the beacon contains identification information, such as an identifier, for example, an identifier of the beacon and/or an identifier of the vehicle. In some cases, the asset tracking device sends the identification information to the central server indicating that the asset tracking device is coupled specifically to a truck identified by or associated with the identification information.

In some implementations, in operation 304, under normal operating mode, the controller may detect a signal from the electronic logging device (ELD) of the truck indicating the truck is in close proximity. In some implementations, the ELD and asset tracking device may communicate using Bluetooth™ or BLE. For example, when the asset tracking device and the ELD are within range, the asset tracking device and the ELD will pair with each other. Once paired, the asset tracking device enters and remains in sleep mode while the asset tracking device and the ELD are within range and paired. For example, the ELD broadcasts a signal detected by the asset tracking device. In response, the asset tracking device enters and remains in sleep mode so long as the asset tracking device is able to detect the continuous and/or periodic signals broadcast by the ELD.

In some implementations, in operation 304, for example, the asset tracking device is set to sleep mode by a driver of the truck. For example, the driver of the truck using a third-party mobile device may communicate with the ELD or the asset tracking device, via a short-range communication system, and may set the asset tracking device to sleep mode. The asset tracking device may remain in sleep mode until the driver of the truck sets the asset tracking device back to normal operating mode.

In some implementations, in the normal operating mode, the asset tracking device may periodically obtain satellite signals and determine its geolocation using the GNSS chip. In operation 304, the asset tracking device may determine it has entered a warehouse area on the basis of a defined geofence. The asset tracking device may be provided with a set of geofences defining known warehouse areas, thereby enabling the device to determine when it has entered a potential warehouse location. When the device detects its geolocation, the controller may be configured to compare the location to the geofence data stored in memory to determine whether the device has entered a geofenced location.

If the geofenced location is defined in the memory as a warehouse location, then the method proceeds where the device determines whether it can detect a truck-mounted beacon signal. If the device detects a beacon signal in operation 304, it then enters the sleep mode in operation 306. As noted earlier, this may include ceasing to wake up the GNSS chip to attempt to obtain geolocation data. In some cases, it is associated with a longer sleep time between wake ups.

In some implementations, the defined geofence includes harbors, ports, yards, depots, distribution centres, etc.

In some implementations, in operation 304, under normal operating mode, the asset tracking device, connected to the electrical system of the trailer attached thereto, may enter sleep mode when the asset tracking device detects a J series 7-pin connection which powers the trailer's electrical functions, such as the turn signals, brake lights, running lights, and/or electric brakes.

In operation 306, on detecting the first trigger indicating the trailer is connected to a truck in operation 304 and the asset tracking device entering a sleep mode, the device ceases powering up the GNSS chip or the cellular transceiver. In some cases, the sleep mode may include powering up the GNSS chip and/or the cellular transceiver less frequently than in the normal operating mode to report its location to the central server.

In some implementations, in operation 306, in response to detecting the first trigger, the asset tracking device transmits a status report to the central server regarding the first trigger. The report may include data regarding the first trigger detected. For example, the asset tracking device may transmit a report containing data regarding the signal from the beacon attached to the truck with an ELD. The data may include identification information from the beacon signal, such as a beacon, truck and/or an ELD identifier. In response to the report, the central server may associate the asset tracking device with the truck and/or ELD. In some cases, the central server may then transmit an instruction to the asset tracking device to cause it to enter the sleep mode.

In operation 306, in some cases, in sleep mode, the controller may be configured to cease receiving and/or reacting to the inertial measurement units, such as accelerometers, which might otherwise have been used to trigger a more frequent geolocation determination and reporting patterns due to detected movements of the device.

In operation 308, the controller determines whether it detects a second trigger. In some implementations, the second trigger may include a loss of a beacon signal or packets from a beacon attached to the rear of a truck, a loss of signal from an ELD installed in the truck, a user input from the driver of the truck, a signal received from the central server, a loss of signal from a J series 7-pin connector, or a signal from an accelerometer and/or a gyroscope.

In operation 308, the second trigger may include one or more of the following: a stop event detected using an inertial sensor in the asset tracking device; a trailer-open event using a sensor configured to detect opening of a door of the trailer; an unpairing signal transmitted by the ELD based on a user input; or a collision based on a collision-detection sensor in the asset tracking device.

In some implementations, in operation 308, if the asset tracking device was placed under sleep mode due to detecting a signal from a beacon coupled to a truck with an ELD using a short-range communications chip, then the loss of that signal may return the asset tracking device to normal operating mode. In some cases, regardless of the first trigger, in operation 304, the asset tracking device may return to the normal operating mode on detecting any of the predetermined or listed second triggers. For example, if the asset tracking device was placed under sleep mode due to detecting a beacon signal from a beacon coupled to a truck with an ELD, the asset tracking device may determine that a potential collision has occurred based on a signal from an accelerometer and may, as a result, return the asset tracking device to normal operating mode.

In some implementations, in operation 308, while in sleep mode, the asset tracking device may cease detecting signals from, or may lose connection with, the ELD of the truck. In such a case, the asset tracking device may return to normal operating mode. For example, if the controller and the ELD were connected or paired via Bluetooth™ in operation 304, the asset tracking device may return to normal operating mode if it loses the connection due to the ELD being out of range.

In some implementations, in operation 308, while in sleep mode, the asset tracking tracking's controller may detect start/stop, trailer door open/close, container on/off, or tampering, based on signals from a 3-axis accelerometer, gyroscope, or one or more other sensors. In response, the asset tracking device may determine a return to the normal operating mode.

In operation 308, on detecting the second trigger indicating the trailer is disconnected from the truck in operation 306 and returning to the normal operating mode, the device powers up the GNSS chip or the cellular transceiver. Thereafter, the asset tracking device resumes receiving a GPS location data and sending GPS location data to the central server on a periodic basis. The device may further power or wake up other sensors that may have been disabled during sleep mode, such as the accelerometer and gyroscope in some cases.

Figure 4:
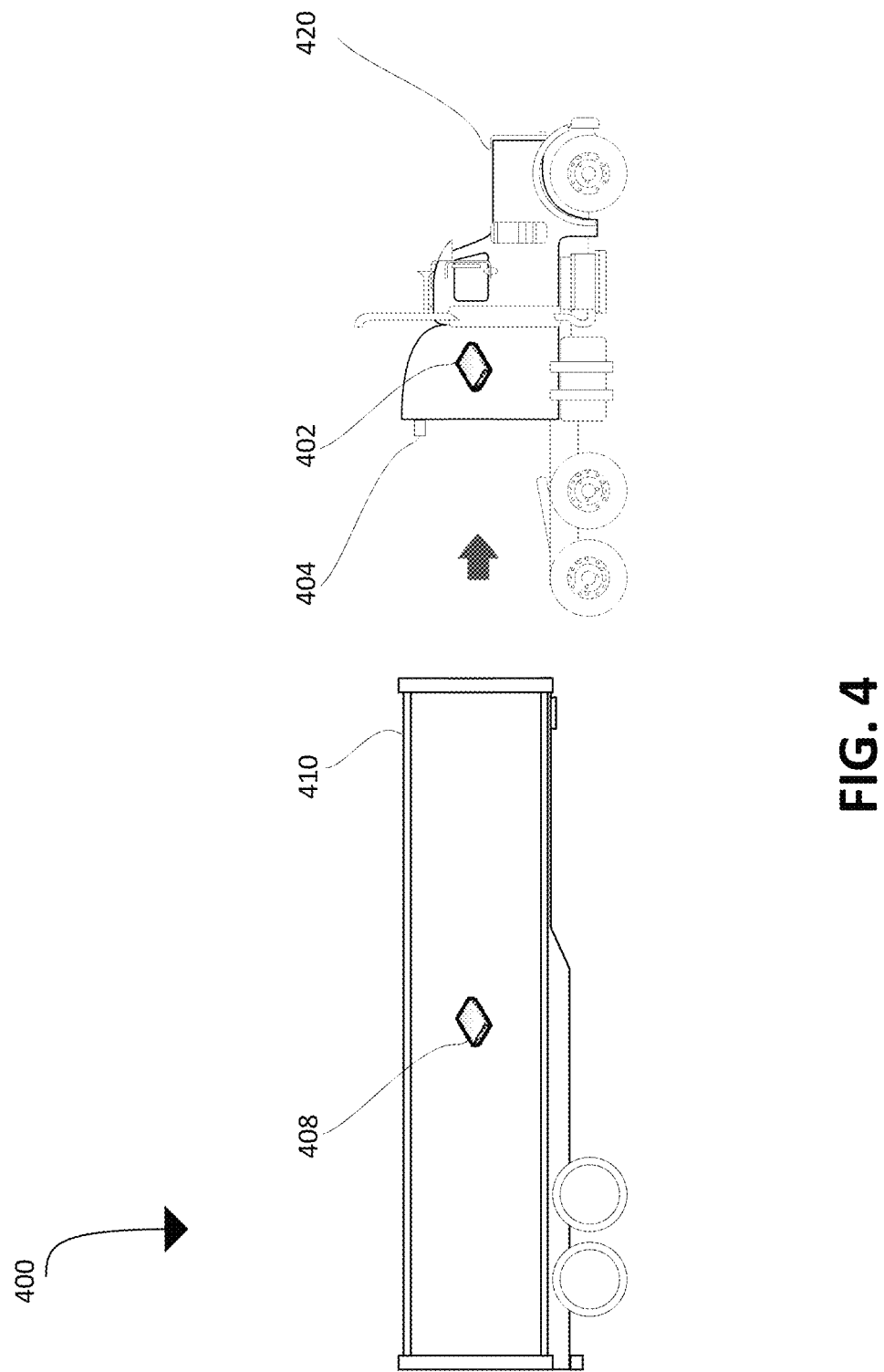
FIG. 4 illustrates an asset tracking device attached to a trailer, a beacon, and an electronic logging device (ELD) mounted on a truck.

Reference now is made to FIG. 4 which provides an example of truck trailer system 400 comprising of an asset tracking device 408 attached to a non-powered asset, such as a trailer 410, a beacon 404 attached to the rear of a truck 420, and an ELD 402 installed within the cab of the truck 420.

In some implementations, as the asset tracking device 408 installed in the trailer 410 approaches the truck 420, the asset tracking device 408 detects a beacon signal from a beacon 404 via Bluetooth™. In some implementations, the asset tracking device 408 uses Bluetooth Low Energy (BLE) to detect the beacon 404, and thereafter, enters sleep mode. In some implementations, the asset tracking device 408 detects the ELD 402 via Bluetooth or BLE, and thereafter, enters sleep mode. In some implementations, the driver initiates the pairing, for example, by using the interface on the ELD 402, between the asset tracking device 408 and the ELD 402. In some implementations, the asset tracking device 408 detects a signal from a radar device having a mmWave frequency-modulated continuous-wave (FMCW) radar module, and thereafter, enters sleep mode. In some implementations, the asset tracking device 408 detects a signal from a radar device having a time-of-flight (TOF) sensor, and thereafter, enters sleep mode.

In some implementations, the asset tracking device 408 and the ELD 402 do not communicate with each other using a short-range communication system, such as Bluetooth™. Instead, the central server of the asset tracking device 408 retrieves geolocation data from the second central server of the ELD 402.

Figure 5:
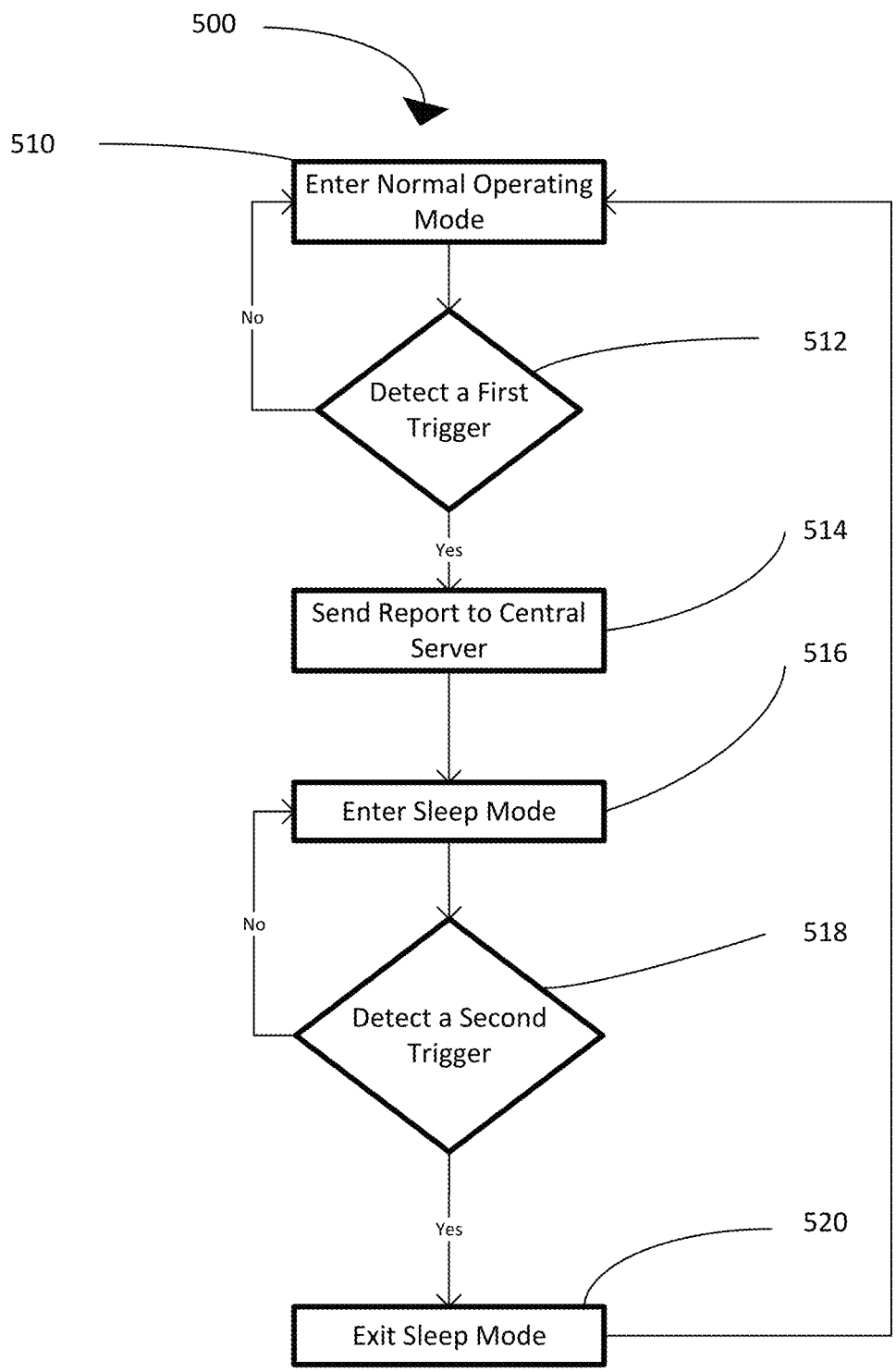
FIG. 5 shows a flowchart of an embodiment of a method of controlling an asset tracking device.

Reference now is made to FIG. 5, which provides an example method 500 of preserving battery power of an asset tracking device. In this example, the asset tracking device is configured to transition between a normal operating mode and a sleep mode on the basis of a beacon located in a truck.

In operation 510, the asset tracking device is configured to operate in a normal operating mode. Under normal operating mode, the asset tracking device retrieves a GPS geolocation data via the GNSS chip, the asset tracking device obtains sensor data from the sensor device, such as temperature, and/or humidity, and the asset tracking device transmits the geolocation data via the cellular transceiver to the central server.

In operation 512, during the normal operating mode, the controller determines whether it detects a first trigger which, in this case, is a beacon signal from the beacon attached to the truck. The asset tracking device may use a short-range communication chip to detect the beacon signal. The beacon signal may include a code or other data indicating that it is broadcast by the beacon. In some cases, the signal may include identification information, which may identify the beacon, the truck, its owner, its planned travel route and/or destination, or other such information. In some cases, the signal may only indicate that it is a truck-mounted transmitter without any additional data.

In operation 514, on detecting the first trigger indicating the trailer is connected to a truck in operation 512, the asset tracking device reports to the central server. The report may include data regarding the detected first trigger. For example, the report may include some or all of the identification information obtained in the beacon signal.

In operation 516, the asset tracking device enters sleep mode. In the sleep mode, the device ceases powering up the GNSS chip and the cellular transceiver.

In operation 518, the controller determines whether it detects a second trigger which, in this case, is a loss of beacon signal from the beacon. The device may use short-range communication chip to detect the loss of the signal. In this case, the trailer and the truck have separated, and the asset tracking device attached thereto is no longer able to detect the signal from the beacon attached to the truck.

In operation 520, the asset tracking device exits sleep mode and the controller powers up the GNSS chip, the cellular transceiver, and the sensor devices.

In some implementations, the asset tracking device includes a pairing mode, wherein after the asset tracking device detects the first trigger, such as a beacon or the ELD, it enters a pairing mode, and using a short-range communication system, establishes a short-range wireless connection with the beacon or ELD. In some implementations, the pairing process may be completed via BLE.

In some implementations, the pairing mode indicates that the trailer and the truck are coupled together. In some cases, pairing mode is deactivated when the trailer and truck become decoupled. In some cases, the pairing mode is activated based on receiving a signal from the central server following a report to the central server regarding the detected first trigger. In some cases, the pairing mode is activated based on receiving driver input directly to the asset tracking device.

The asset tracking device may exit the pairing mode after detecting the second trigger, such as based on a loss of signal from a beacon. In some implementations, the pairing mode and the sleep mode are activated at the same time. In some implementations, the pairing mode is deactivated based on the second triggers noted above for entering and exiting sleep mode.

In some implementations, in the sleep mode of the asset tracking device, the components may be configured individually. For example, the controller of the asset tracking device will be kept operating while the GNSS chip and the cellular transceiver are turned off. In some implementations, a sensor, such as an accelerometer will be kept operating, while the GNSS chip and the cellular transceiver are turned off.

In some implementations, while the asset tracking device is in sleep mode, the cellular transceiver or modem may be placed in a power-saving mode (PSM), or an eDRX mode.

In some implementations, the ELD may provide more frequent updates to the central server compared to the asset tracking device in normal operating mode. In some implementations, the ELD integration will provide live tracking to the central server regardless of whether the truck is in motion or stationery.

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A method of preserving battery power for an asset tracking device, the method comprising:
    detecting, at the asset tracking device attached to a trailer, using a communication system, a first trigger identifying a third-party electronic logging device (ELD) attached to a truck in close proximity, and in response, generating an association between the trailer and the truck, wherein the ELD has a first mobile network connection and a location tracking capability;
    responsive to detecting the first trigger, entering, at the asset tracking device, a sleep mode in which the asset tracking device does not periodically determine its location using a global navigation satellite system (GNSS) chip and does not periodically power a cellular transceiver; and
    detecting, at the asset tracking device, a second trigger and, in response, exiting the sleep mode and entering a normal operating mode in which the asset tracking device is configured to periodically determine its location using the GNSS chip, to periodically power the cellular transceiver to seek a connection to a mobile network, and to provide location data from the GNSS chip to a central server over the connection to the mobile network.

2. The method of claim 1, wherein the ELD is configured to provide location data to the central server and wherein the method further comprises determining a location of the asset tracking device based on the location data sent by the ELD and the association between the trailer and the truck.

3. The method of claim 1, wherein the first trigger includes detecting a short-range broadcast signal from the ELD and the method further comprising entering a pairing mode at the asset tracking device and, using a short-range communication system, establishing a short-range wireless connection with the ELD.

4. The method of claim 3, wherein detecting the second trigger includes detecting loss of the short-range wireless connection with the ELD.

5. The method of claim 1, wherein detecting the first trigger includes detecting a short-range beacon signal from a beacon mounted on the truck and the association between the truck and the trailer is generated based on an identifier in the beacon signal.

6. The method of claim 5, wherein detecting the second trigger includes failing to detect the short-range beacon signal from the beacon.

7. The method of claim 5, further comprising transmitting the identifier to the central server and receiving, from the central server, an instruction to enter the sleep mode.

8. The method of claim 1, wherein the second trigger includes one or more of detecting a stop event using an inertial sensor in the asset tracking device; detecting a trailer-open event using a sensor configured to detect opening of a door of the trailer; detecting an unpairing signal transmitted by the ELD based on a user input; or detecting a collision based on a collision-detection sensor in the asset tracking device.

9. The method of claim 1, further comprising, responsive to detecting the first trigger, sending a report to the central server regarding the first trigger.

10. The method of claim 1, further comprising, responsive to detecting the second trigger, sending a report to the central server regarding the second trigger.

11. An asset tracking device comprising:
a short-range communication system;
a global navigation satellite system (GNSS) chip;
a cellular transceiver;
a controller; and
a memory storing processor executable instructions that, when executed by the controller, cause the controller to:
  detect, using a communication system, a first trigger identifying a third-party electronic logging device (ELD) attached to a truck in close proximity, and in response, generate an association between a trailer and the truck, wherein the ELD has a first mobile network connection and a location tracking capability;
  in response to detecting the first trigger, entering a sleep mode in which the asset tracking device does not periodically determine its location using the GNSS chip and does not periodically power a cellular transceiver; and
  detect a second trigger, and in response, exit the sleep mode and enter a normal operating mode in which the asset tracking device is configured to periodically determine its location using the GNSS chip, to periodically power the cellular transceiver to seek a connection to a mobile network, and to provide location data from the GNSS chip to a central server over the connection to the mobile network.

12. The asset tracking device of claim 11, wherein the ELD is configured to provide location data to the central server, and the central server determines a location of the asset tracking device based on the location data sent by the ELD and the association between the trailer and the truck.

13. The asset tracking device of claim 11, wherein the first trigger includes a short-range broadcast signal from the ELD and thereafter, the asset tracking device enters a pairing mode and, using a short-range communication system, establishing a short-range wireless connection with the ELD.

14. The asset tracking device of claim 13, wherein the second trigger includes a loss of the short-range wireless connection with the ELD.

15. The asset tracking device of claim 11, wherein the first trigger includes a short-range beacon signal from a beacon mounted on the truck and the association between the truck and the trailer is generated based on an identifier in the beacon signal.

16. The asset tracking device of claim 15, the second trigger includes failing to detect the short-range beacon signal from the beacon.

17. The asset tracking device of claim 15, wherein the instructions, when executed, are to cause the controller to transmit the identifier to the central server and receiving, from the central server, an instruction to enter the sleep mode.

18. The asset tracking device of claim 11, wherein the second trigger includes one or more of the following: a stop event using an inertial sensor in the asset tracking device; a trailer-open event using a sensor configured to detect opening of a door of the trailer; an unpairing signal transmitted by the ELD based on a user input; or a collision based on a collision-detection sensor in the asset tracking device.

19. The asset tracking device of claim 11, wherein the instructions, when executed, are to cause the controller to send, in response to detecting the first trigger, a report to the central server regarding the first trigger.

20. The asset tracking device of claim 11, wherein the instructions, when executed, are to cause the controller to send, in response to detecting the second trigger, a report to the central server regarding the second trigger.

\* \* \* \* \*